United States Patent
Buda et al.

(10) Patent No.: US 10,776,231 B2
(45) Date of Patent: Sep. 15, 2020

(54) ADAPTIVE WINDOW BASED ANOMALY DETECTION

(71) Applicant: International Business Machines Corporation, Armonk, NY (US)

(72) Inventors: Teodora S. Buda, Dublin (IE); Hitham Ahmed Assem Aly Salama, Dublin (IE); Faisal Ghaffar, Dunboyne (IE); Lei Xu, Dublin (IE); Bora Caglayan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 16/204,110

(22) Filed: Nov. 29, 2018

(65) Prior Publication Data

US 2020/0174902 A1  Jun. 4, 2020

(51) Int. Cl.
| G06F 11/00 | (2006.01) |
| G06F 11/22 | (2006.01) |
| G06N 20/00 | (2019.01) |
| G06F 16/23 | (2019.01) |
| G06F 11/30 | (2006.01) |
| G06F 16/901 | (2019.01) |
| G06F 11/07 | (2006.01) |

(52) U.S. Cl.
CPC ........ G06F 11/2257 (2013.01); G06F 11/079 (2013.01); G06F 11/3068 (2013.01); G06F 16/2365 (2019.01); G06F 16/2379 (2019.01); G06F 16/9024 (2019.01); G06N 20/00 (2019.01)

(58) Field of Classification Search
CPC .............. G06F 16/9024; G06F 11/079; G06F 11/3051; G06F 11/3068; G06F 11/2257; G06F 11/2263
See application file for complete search history.

(56) References Cited

U.S. PATENT DOCUMENTS

| 8,682,812 B1 | 3/2014 | Ranjan |
| 9,134,347 B2 | 9/2015 | Niles et al. |
| 9,516,053 B1 * | 12/2016 | Muddu ................ G06N 5/022 |

(Continued)

FOREIGN PATENT DOCUMENTS

EP   3139313 A2   3/2017

OTHER PUBLICATIONS

Guan et al., "Ensemble of Bayesian Predictors and Decision Trees for Proactive Failure Management in Cloud Computing Systems", Journal of Communications, vol. 7, No. 1, Jan. 2012, © Academy Publisher, pp. 52-61.

(Continued)

*Primary Examiner* — Charles Ehne
(74) *Attorney, Agent, or Firm* — David K. Mattheis

(57) ABSTRACT

Detecting data anomalies by receiving a first data set related to a first variable metric, determining data anomaly detection scores for data points of the first data set according to a plurality of data anomaly detection techniques, generating an adaptive ground-truth window according to the data anomaly detection scores, assigning a weighting value to each data point within the adaptive ground-truth window, training a machine learning system using the set of data anomaly detection scores and weighting values, and providing a trained machine learning system for evaluating a second data set.

20 Claims, 4 Drawing Sheets

(56) References Cited

U.S. PATENT DOCUMENTS

| | | |
|---|---|---|
| 9,699,049 B2 | 7/2017 | Gupta et al. |
| 2006/0242706 A1 | 10/2006 | Ross |
| 2008/0256397 A1 | 10/2008 | Smith |
| 2013/0046493 A1 | 2/2013 | Hoogs et al. |
| 2015/0033084 A1* | 1/2015 | Sasturkar .......... G06F 16/24578 714/46 |
| 2015/0355957 A1* | 12/2015 | Steiner .................. G06F 11/079 714/37 |
| 2016/0103838 A1* | 4/2016 | Sainani ............... H04L 41/5012 707/725 |
| 2016/0147583 A1* | 5/2016 | Ben Simhon ....... H04L 43/0823 714/47.3 |
| 2018/0247220 A1 | 8/2018 | Assem Aly Salama et al. |

OTHER PUBLICATIONS

Ibidunmoye et al., "Adaptive Anomaly Detection in Performance Metric Streams", IEEE Transactions on Network and Service Management, vol. 14, No. 8, Aug. 2017, pp. 1-14.

Mell et al., "The NIST Definition of Cloud Computing", Recommendations of the National Institute of Standards and Technology, Special Publication 800-145, Sep. 2011, 7 pages.

\* cited by examiner

ADAPTIVE WINDOW BASED ANOMALY DETECTION

The project leading to this application has received funding from the European Union's Horizon 2020 Research and Innovation Programme under Grant Agreement No. 671625

BACKGROUND

The disclosure relates generally to preemptively detecting data anomalies, and specifically to adaptively detecting data anomalies.

Data anomaly detection refers to the problem of identifying patterns in data that deviate from expected patterns. It has been widely applied in a variety of applications, such as fraud detection for banking and financial industries, intrusion and anomalous traffic pattern detection for cybersecurity, and performance degradation for network resource management. Anomaly detection may be performed by statistical techniques such as Multivariate Adaptive Statistical Filtering or machine learning techniques such as clustering and nearest-neighbor based detection algorithms.

SUMMARY

Aspects of the invention disclose methods, systems and computer readable media associated with proactively detecting anomalies including receiving a first data set related to a first metric, determining data anomaly detection scores for data points of the first data set according to a plurality of data anomaly detection techniques, generating an adaptive ground-truth window according to the data anomaly detection scores, assigning a weighting value to each data point within the adaptive ground-truth window, training a machine learning system using the set of data anomaly detection scores and weighting values by one or more computer processors, and providing a trained machine learning system for evaluating a second data set.

DETAILED DESCRIPTION

Figure 1:
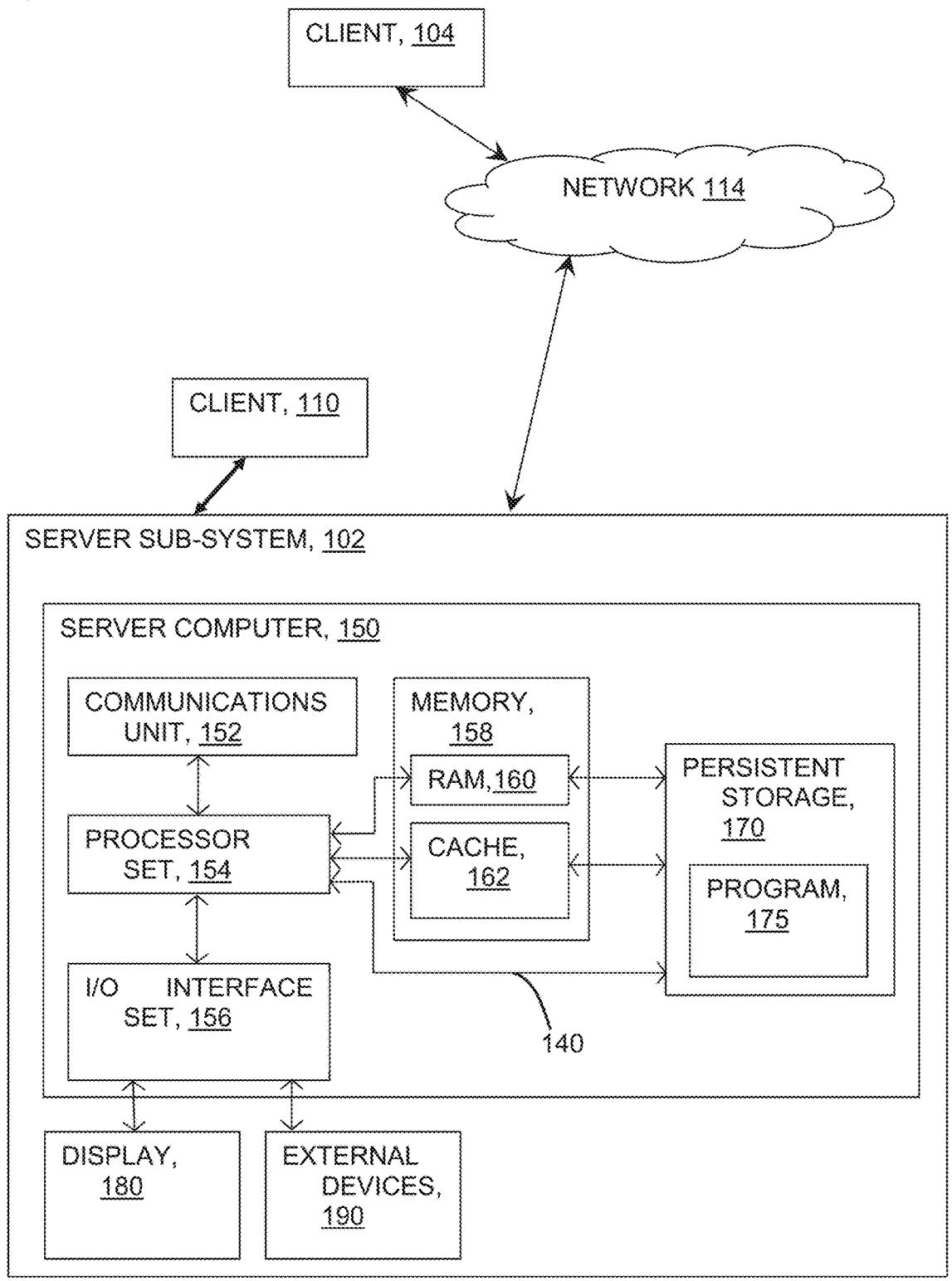
FIG. 1 provides a schematic illustration of system components, according to an embodiment of the invention.

Preemptive detection of anomalies in data sets may enable anomaly response activities to begin earlier thereby potentially reducing any negative consequences associated with the anomaly. Typical monitoring activities detect anomalous data after the occurrence of the anomaly and after the beginning of associated negative consequences. Typical anomaly detection may include the use of a fixed-size anomaly detection window centered upon an identified anomalous data point. The fixed-size window does not vary or adapt to the data. The use of a static window for anomaly detection may include the association of non-anomalous data with an anomaly. What is needed is a preemptive way to predict anomalies before occurrence to enable proactive measures to be implemented prior to the anomaly.

The disclosed methods and systems improve upon current methods and systems by increasing the likelihood of early anomaly detection and also reducing the likelihood of false anomaly detection. The methods and systems provide more reliable and faster detection of data anomalies. This is accomplished by adapting the window of data points considered for training an anomaly detection system. The adaptive windows include points likely representative of an impending anomaly and exclude data points which are not typically representative of an anomaly.

The disclosed methods, products and systems may be applied to time stamped data sets associated with any variable metric. Data associated with personal health metrics as well as network system resource availability and system operations metrics may be evaluated.

In an embodiment, a first data set associated with a first metric is provided to an evaluation system comprising the method of an embodiment. The data may be single or multi-variable time stamped digital data wherein data points are associated with a particular time and date. As used herein, the terms preceding and following refer to the time stamped data considered in order from the earliest occurring to the latest occurring.

In this embodiment, the data value(s) associated with each time value are evaluated using a plurality of data anomaly detection techniques. Representative anomaly detection techniques include Multivariate Statistical Filtering, or machine learning techniques including clustering and nearest-neighbor based detection algorithms. These evaluations yield a set of anomaly probabilities for each time-stamped data point. Probability values of greater than 0.5 indicate a greater than 50% probability that the data point represents an anomaly within the data set. A score of 1 indicates a 100% probability that the data point is anomalous within the data set. The evaluation results for each point include the time stamp of the data, the actual data value, and the anomaly probability score from each method used to evaluate the data point.

The results of the evaluation may be used to generate one or more adaptive ground-truth windows for the data set. Adaptive ground-truth window generation begins with identifying a data point having a probability of 1 from one or more of the evaluation techniques. This high probability data point is considered the ground-truth anomaly point for the adaptive ground-truth window. In an embodiment, a user defined static window is utilized in defining the adaptive ground-truth window. The static window size may be defined as a specified number of data points or by a specified time duration. Initiating the adaptive ground-truth window may then occur by examining data points starting at a data point preceding the ground-truth point by the size of the defined static window in either data points or time. Each subsequent data point is then examined in temporal order to determine if any of the anomaly detection scores for the data point are greater than a predetermined threshold value. In one embodiment, a threshold value of 0.5 provides that the data point with a score greater than the threshold has a greater than 50% chance of being an anomaly. In this embodiment, the first data point within the defined static window preceding the ground-truth point having an anomaly detection score greater than 0.5, defines the beginning of the adaptive ground-truth window. Data points following the ground-truth point, up to the data point defining the size of the defined static window after the ground-truth data point, are also examined. Terminating the adaptive ground-truth window occurs at the last data point after the ground-truth point, within the defined static window, having an anomaly detection score greater than a threshold value, in this embodiment 0.5.

In one embodiment, the adaptive ground-truth window may be defined by examining the anomaly detection scores of data points preceding and following the ground-truth anomaly point. This examination may be used to identify the first point prior to the ground-truth point having an anomaly detection score greater than 0.5, and the last point after the ground-truth point having an anomaly detection score greater than 0.5. These two points are then defined as the initiation and termination of the adaptive ground-truth window.

After the set of data points defining the adaptive ground-truth window have been identified, anomaly weighting values are assigned to each data point within the adaptive ground-truth window. The anomaly weighting values comprise an assigned probability that the instant data point constitutes an anomaly. In an embodiment, the anomaly weighting values start with a high value, near 1.0, at the beginning of the adaptive ground-truth window. The anomaly weighting values then be decreased over the course of the set of data points within the window until the last data pint of the adaptive ground-truth window. The last data point of the adaptive ground-truth window has a value of at least about 0.5. Ranging the values of the anomaly weighting from high to low over the span of the adaptive ground-truth window enhances the likelihood of early anomaly detection. In this embodiment, all data points of the set which are outside of any ground-truth window are assigned an anomaly weighting value of 0.0.

In an embodiment, the values of the anomaly weighting values start at about 0.5 for the first data point of the adaptive ground-truth window. The anomaly weighting values increase for subsequent data point values across the adaptive ground-truth window. The final point of the window has an anomaly weighting value of less than about 1.0. In this embodiment, all data points of the set which are outside of any ground-truth window are assigned an anomaly weighting value of 0.0.

In an embodiment, a machine learning system, such as a neural network system or gradient boosting tree system is trained to detect anomalies using the data set labeled with anomaly detection scores and anomaly weighting values. In this embodiment, training the machine learning system with the labeled data set having weighting values descending across the adaptive ground-truth window increases the likelihood of the model preemptively detecting anomalies.

In an embodiment, a second set of data, associated with the same variable metric as the training data set, may be evaluated with the trained model. The trained model identifies data anomalies prior to the probability of a data anomaly reaching 100%. This preemptive identification enables proactive steps to be initiated prior to an anomalous occurrence.

In an example, a model is trained using system server resource requests. For the initial data sets, system resource outages caused by resource requests exceeding available system resources constitute the data anomaly. The initial data set is evaluated using the anomaly detection methods and the set of anomaly detection scores is added to the original data set. The scored data set is then processed using the disclosed method and adaptive ground-truth windows are added to the data set together with anomaly weighting values. The weighted data set with adaptive ground-truth windows is then used to train a gradient boosting tree, machine learning algorithm. The trained machine learning system is then used to process similar data for a system. The active system uses the anomaly detection methods to score data as it is added to the ongoing data set. The trained algorithm then evaluates the scored data for anomalies. As anomalies are detected by the method, alerts may be sent, and pre-programmed activities associated with the detection of an anomaly may be executed. In this example, as an anomaly is detected, additional system resources may be brought online, eliminating or reducing any system service issues.

The following non-limiting example provides a contrasting view of handling anomalous data by the use of a static ground-truth window and the adaptive ground-truth window of the disclosure. A portion of data set comprising nine data points includes an anomaly. Analysis of the data set using a single anomaly detection technique may yield an anomaly scoring set of: [0, 0, 0, 0, 1, 0, 0, 0, 0] wherein the single value of 1 indicates the detected anomaly. As no other point registered s an anomaly, all other points may be scored at 0. Evaluating the same none data points using the multiple anomaly detection methods according to the disclosed method may yield an anomaly scoring set of: [0.3, 0.4, 0.7, 0.8, 1, 0.8, 0.6, 0.3, 0.1].

Utilizing the static window approach, static ground-truth window for the first anomaly scoring set would be [0.9, 0.8, 0.7, 0.6, 0.5, 0, 0, 0, 0], while the adaptive ground-truth window for the second anomaly scoring set according to the disclosure would be: [0, 0, 0.9, 0.8, 0.7, 0.6, 0.5, 0, 0] as the third data point received an anomaly detection score above the threshold value and the seventh data point was the last data point having an anomaly detection score above the threshold.

Training the detection model using the first ground-truth window includes data points having an anomaly detection score of zero, potentially skewing the trained model toward generating false anomaly detections. Utilizing the method of the disclosure results in a training set wherein all data points used to train the model have at least a 50% probability of being an anomaly according to at least one anomaly detection methodology. This difference in training methods yields a more reliable trained model with a lower tendency to generate a false anomaly detection.

FIG. 1 provides a schematic illustration of a networked computer system 1000 adapted for use in support of the disclosed methods. The illustrated details are applicable to datacenter systems as well as data carrier systems. As shown in the figure, server sub-system 102 may be connected to client system 110 directly, and client system 104, by way of network 114. Server sub-system 102, equally applicable to client systems 104 and 110, includes server computer 150 which in turn can include processor set 154, comprising one or more processors, memory 158, comprising random access memory (RAM) 160 and cache memory 162, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160 and cache memory 162. In general, memory 158 can include any suitable volatile or non-volatile computer readable storage media. Cache 162 is a fast memory that enhances the performance of processor set 154 by holding recently accessed data, and data near recently accessed data, from memory 158.

Program instructions and data used to practice embodiments of the present invention, e.g., the anomaly detection program 175, are stored in persistent storage 170 for execution and/or access by one or more of the respective processor set 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing programmed instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, Communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., anomaly detection program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
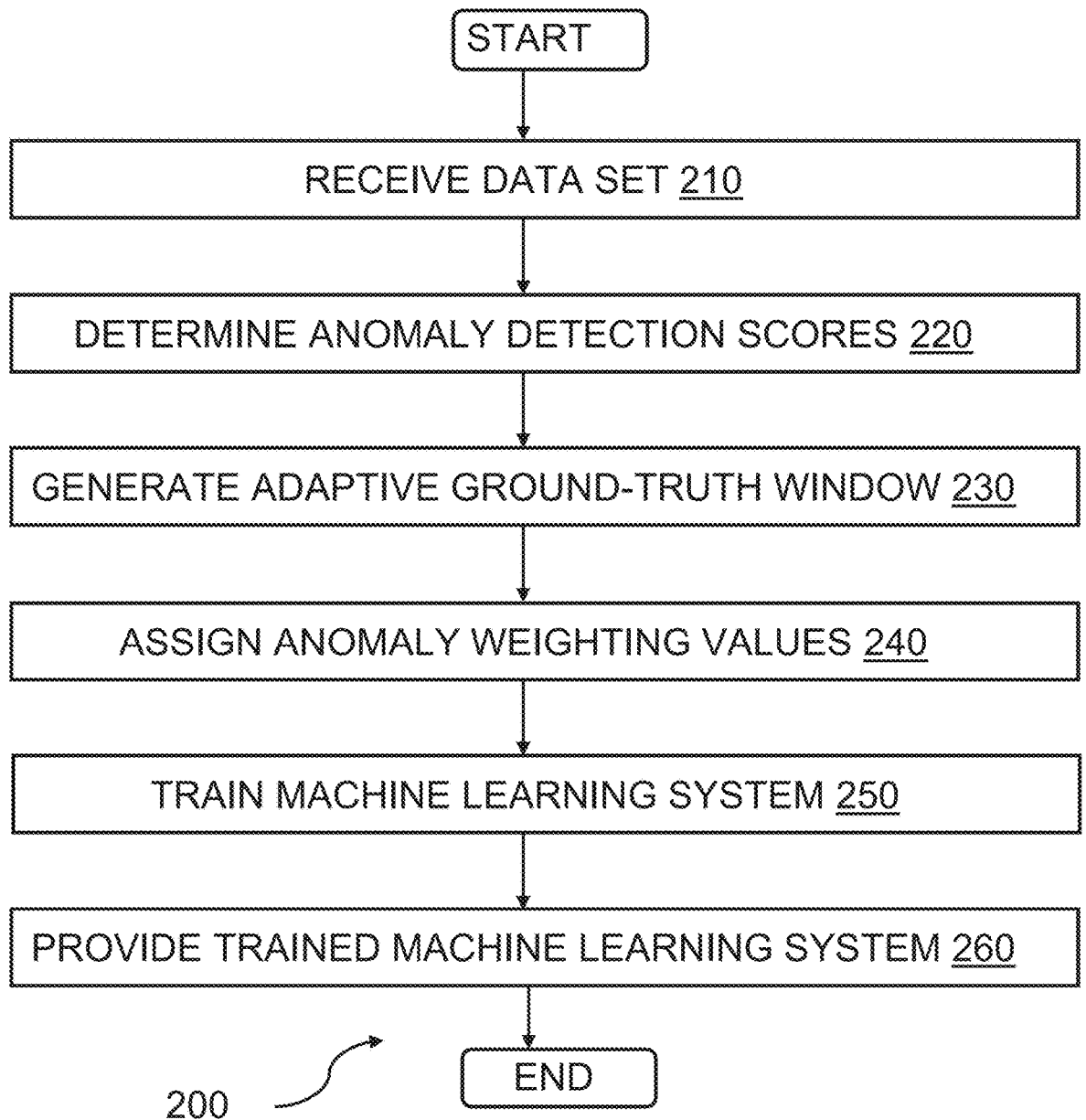
FIG. 2 provides a flowchart depicting the logical execution of steps, according to an embodiment of the invention.

FIG. 2 depicts operational activities associated with execution of the disclosed inventions in flowchart 200. At 210, a data set associated with one or more variable metrics is received by a computing system. The data set is analyzed using a plurality of anomaly detection methods and anomaly detection scores are determined for each data point of the data set at 220. Adaptive ground-truth windows are then generated at 230 for each anomalous data point detected at 220. Anomaly weighting values are assigned to the data points within the adaptive ground-truth windows at 240. All data points outside the ground-truth windows are assigned a weighting value of 0. A machine learning system such as a neural network or gradient boosting tree is trained at 250 to identify anomalous data points using the weighted data set from 240. The trained machine learning system from 250 is then provided for use on additional data sets at 260. The provided machine learning system may then be used to analyze data sets associated with the same variable metric as the original data set.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
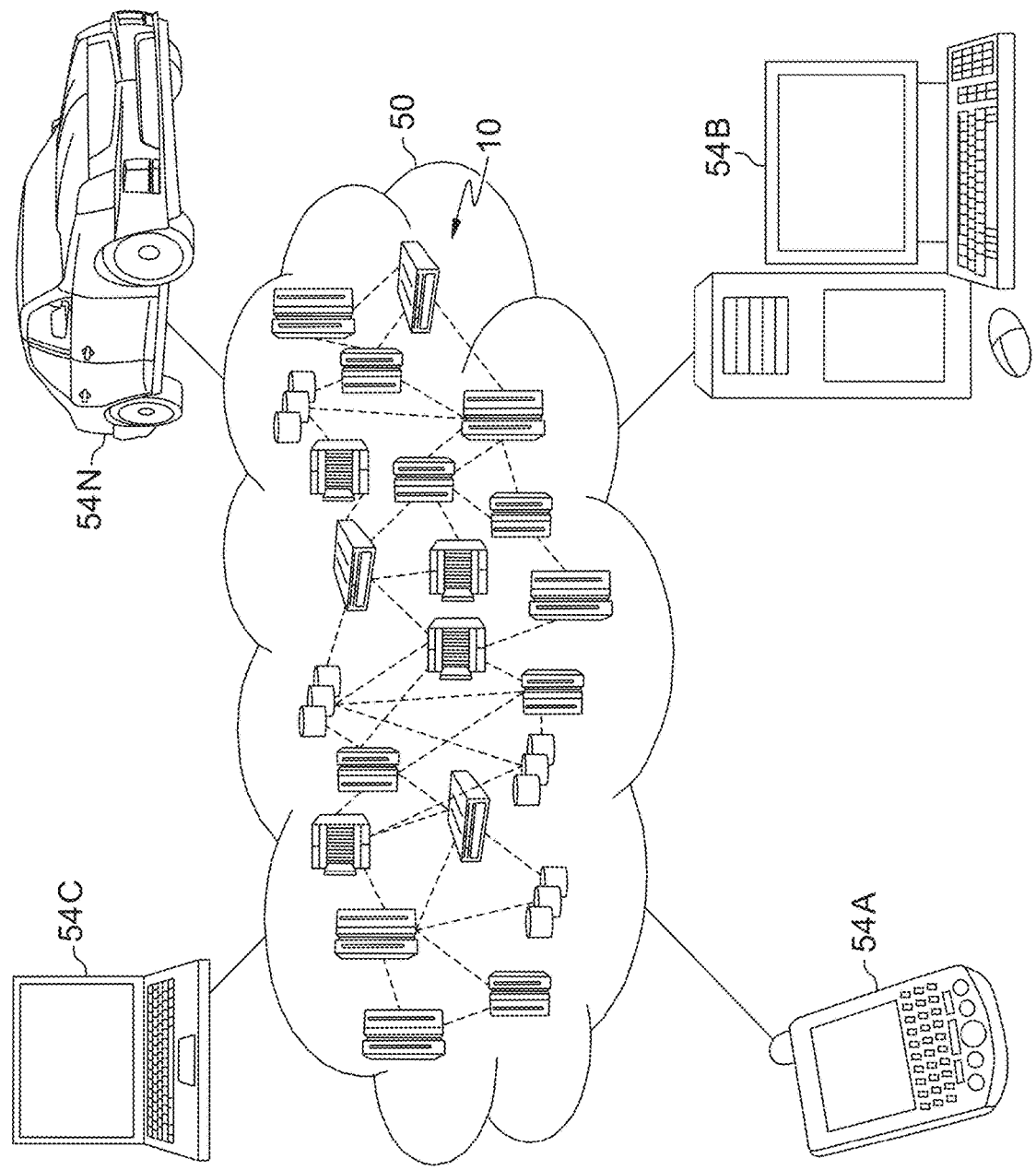
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
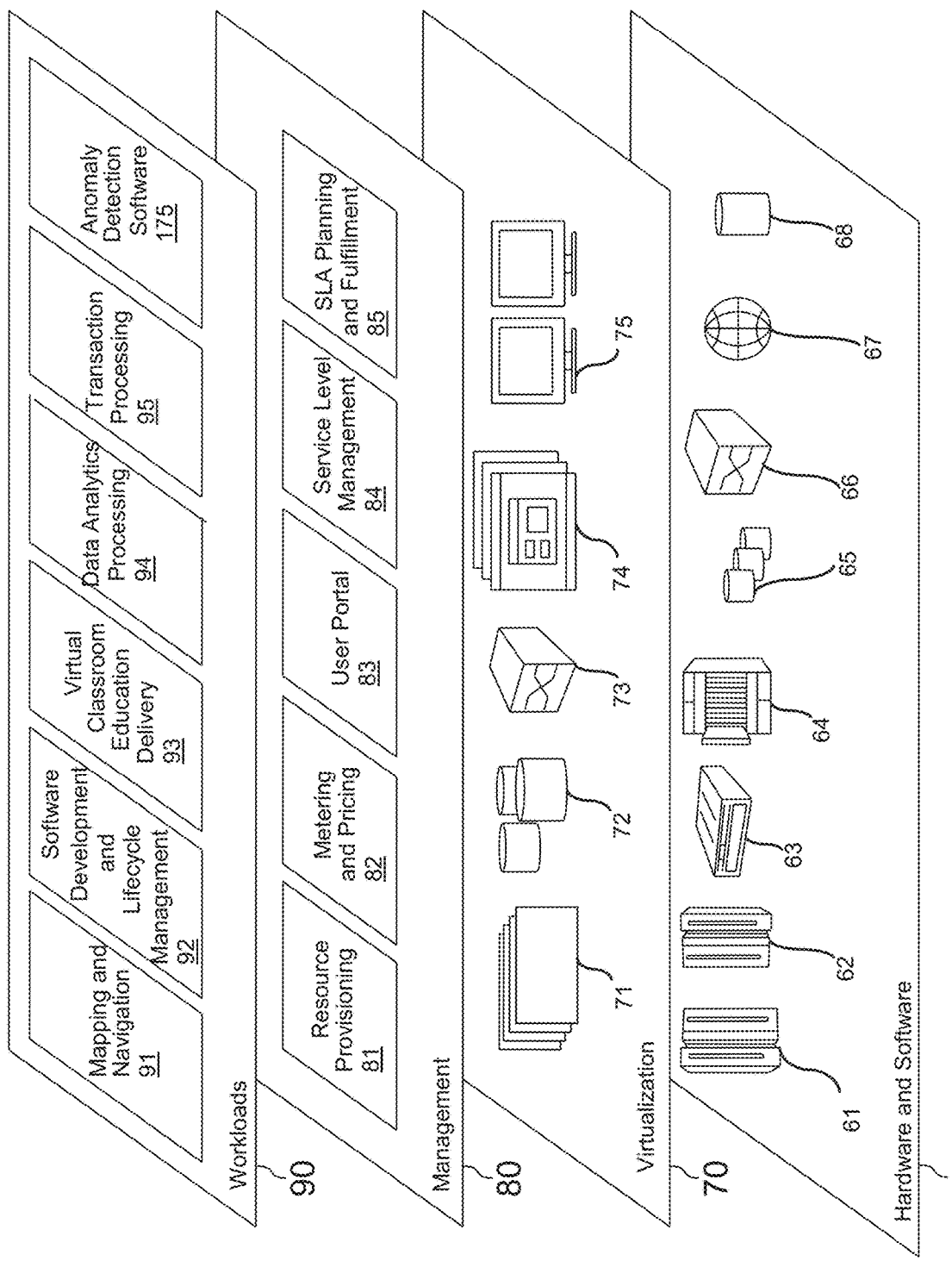
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection program 175.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for data anomaly detection, the method comprising:

receiving a first data set related to a first metric by one or more computer processors;

determining, by one or more computer processors, a set of data anomaly detection scores for each data point of the first data set according to a plurality of data anomaly detection techniques;

generating, by one or more computer processors, an adaptive ground-truth window according to the data anomaly detection scores;

assigning, by one or more computer processors, a weighting value to each data point within the adaptive ground-truth window;

training, by one or more computer processors, a machine learning system using the data anomaly detection scores and weighting values; and providing, by one or more computer processors, the machine learning system for evaluating a second data set.

2. The computer implemented method according to claim 1, wherein generating an adaptive ground-truth window according to the data anomaly detection scores comprises: initiating, by one or more computer processors, the adaptive ground-truth window at a data point preceding a detected anomaly and having a data anomaly detection score greater than a threshold value.

3. The computer implemented method according to claim 1, wherein generating an adaptive ground-truth window according to the data anomaly detection scores comprises: terminating, by one or more computer processors, the adaptive ground-truth window at a data point following a detected anomaly and having a data anomaly detection score greater than a threshold value.

4. The computer implemented method according to claim 1, wherein assigning a weighting value to each data point within the adaptive ground-truth window comprises: assigning, by one or more computer processors, anomaly probabilities to window data points.

5. The computer implemented method according to claim 1, wherein the weighting value is decreased, by one or more computer processors, from a first data point to a last data point within the adaptive ground-truth window.

6. The computer implemented method according to claim 1, wherein generating an adaptive ground-truth window according to the set of data anomaly detection scores comprises:

defining, by one or more computer processors, an anomalous data point;

defining, by one or more computer processors, a static window size;

initiating, by one or more computer processors, data point evaluation with a data point preceding the anomalous data point by the static window size; and terminating, by one or more computer processors, data point evaluation with a data point following the anomalous data point by the static window size.

7. The computer implemented method according to claim 1 wherein the second data set is related to the first metric.

8. A computer program product for data anomaly detection, the computer program product comprising one or more computer readable storage devices and program instructions stored on the one or more computer readable storage devices, the program instructions comprising:

programmed instructions receiving a first data set related to a first metric;

programmed instructions determining data anomaly detection scores for each data point of the first data set according to a plurality of data anomaly detection techniques;

programmed instructions generating an adaptive ground-truth window according to the data anomaly detection scores;

programmed instructions assigning a weighting value to each data point within the adaptive ground-truth window;

programmed instructions training a machine learning system using the data anomaly detection scores and weighting values; and programmed instructions providing the machine learning system for evaluating a second data set.

9. The computer program product according to claim 8, wherein the programmed instructions generating an adaptive ground-truth window according to the data anomaly detection scores comprises programmed instructions initiating the adaptive ground-truth window at a data point preceding a detected anomaly and having a data anomaly detection score greater than a threshold value.

10. The computer program product according to claim 8, wherein the programmed instructions generating an adaptive ground-truth window according to the data anomaly detection scores comprises terminating the adaptive ground-truth window at a data point following a detected anomaly and having a data anomaly detection score greater than a threshold value.

11. The computer program product according to claim 8, wherein the programmed instructions assigning a weighting value to each data point within the adaptive ground-truth window comprises programmed instructions assigning anomaly probabilities to window data points.

12. The computer program product according to claim 8, wherein the weighting value is decreased from a first data point to a last data point within the adaptive ground-truth window.

13. The computer program product according to claim 8, wherein the programmed instructions generating an adaptive ground-truth window according to the data anomaly detection scores comprises:

programmed instructions defining, an anomalous data point;

programmed instructions defining a static window size;

programmed instructions initiating data point evaluation with a data point preceding the anomalous data point by the static window size; and programmed instructions terminating data point evaluation with a data point following the anomalous data point by the static window size.

14. The computer program product according to claim 8, wherein the second data set is related to the first metric.

15. A computer system for data anomaly detection, the computer system comprising:

one or more computer processors;

one or more computer readable storage devices;

program instructions stored on the one or more computer readable storage devices for execution by the at least on computer processor, the program instructions comprising:

programmed instructions receiving a first data set related to a first metric;

programmed instructions determining data anomaly detection scores for each data point of the first data set according to a plurality of data anomaly detection techniques;

programmed instructions generating an adaptive ground-truth window according to the data anomaly detection scores;

programmed instructions assigning a weighting value to each data point within the adaptive ground-truth window;

programmed instructions training a machine learning system using the data anomaly detection scores and weighting values; and programmed instructions providing the machine learning system for evaluating a second data set.

16. The computer system according to claim 15, wherein the programmed instructions generating an adaptive ground-truth window according to the data anomaly detection scores comprises programmed instructions initiating the adaptive ground-truth window at a data point having a data anomaly detection score greater than a threshold value.

17. The computer system according to claim 15, wherein the programmed instructions generating an adaptive ground-truth window according to the data anomaly detection scores comprises terminating the adaptive ground-truth window at a data point following a detected anomaly and having a data anomaly detection score greater than a threshold value.

18. The computer system according to claim 15, wherein the programmed instructions assigning a weighting value to each data point within the adaptive ground-truth window comprises programmed instructions assigning anomaly probabilities to adaptive ground-truth window data points.

19. The computer system according to claim 15, wherein the weighting value is decreased from a first data point to a last data point within the adaptive ground-truth window.

20. The computer system according to claim 15, wherein the programmed instructions generating an adaptive ground-truth window according to the set of data anomaly detection scores comprises:
- programmed instructions defining, an anomalous data point;
- programmed instructions defining a static window size;
- programmed instructions initiating data point evaluation with a data point preceding the anomalous data point by the static window size; and
- programmed instructions terminating data point evaluation with a data point following the anomalous data point by the static window size.

* * * * *